United States Patent [19]
Krabbenhoft

[11] Patent Number: 5,959,064
[45] Date of Patent: Sep. 28, 1999

[54] POLYESTERCARBONATES WHICH EXHIBIT IMPROVED PROCESSIBILITY

[75] Inventor: Herman Otto Krabbenhoft, Scotia, N.Y.

[73] Assignee: General Electric Company, Schenectady, N.Y.

[21] Appl. No.: 09/110,277

[22] Filed: Jul. 6, 1998

[51] Int. Cl.⁶ ..................................................... C08G 64/00
[52] U.S. Cl. .......................... 528/196; 528/271; 528/272
[58] Field of Search ..................................... 528/196, 271, 528/272

[56] References Cited

U.S. PATENT DOCUMENTS

| | | | |
|---|---|---|---|
| 4,286,083 | 8/1981 | Kochanowski | 528/173 |
| 4,983,706 | 1/1991 | Fontana et al. | 528/176 |
| 5,025,081 | 6/1991 | Fontana et al. | 528/176 |
| 5,274,068 | 12/1993 | Boden et al. | 528/179 |

*Primary Examiner*—Terressa Mosley
*Attorney, Agent, or Firm*—Noreen C. Johnson; Douglas E. Stoner

[57] ABSTRACT

The invention relates to a polyestercarbonate polymer which comprises repeating units of a mono-unsaturated aliphatic dicarboxylic acid having about 12 to about 20 carbon atoms. Preferred dicarboxylic acids for incorporation into the polymer are cis-octadec-9-enedioic acid or trans-octadec-9-enedioic acid. The use of these mono-unsaturated acids results in polymers with lower glass transition temperatures, and enhances processibility.

26 Claims, No Drawings

POLYESTERCARBONATES WHICH EXHIBIT IMPROVED PROCESSIBILITY

This invention was made with Government support under Government Contract No. DEFC36-956010099, awarded by the Department of Energy. The Government has certain rights in this invention.

TECHNICAL FIELD

This invention relates generally to polymers, and more particularly, to polyestercarbonates having improved properties.

BACKGROUND OF THE INVENTION

Melt flow is an important attribute of polycarbonate materials, in view of their relatively high melt viscosity. The high viscosity necessitates the use of high extrusion and molding temperatures when processing the materials. A great deal of effort has been directed toward reducing the melt viscosity of polycarbonates. For example, plasticizers have been incorporated into the polymer systems, or the molecular weight of the polymer has been reduced in some instances. The melt flow characteristic is directly related to its glass transition temperature (Tg). In other words, a decrease in Tg results in a desirable decrease in melt viscosity.

Polyestercarbonates exemplify another very useful technique for reducing the melt flow of polycarbonates. These materials (which are sometimes referred to as "copolyestercarbonates") can be considered as members of the family of polycarbonates, utilizing two of the same starting materials: a dihydric phenol and a carbonate precursor. The polyestercarbonates also contain an aliphatic chain segment of varying length, incorporated by the use of a suitable precursor material, such as an aliphatic dicarboxylic acid. The aliphatic segment increases the melt-flow of the polymer. Polyester-carbonates are described in a variety of references, such as the following U.S. Pat. Nos. 5,274,068 (Boden et al); 5,025,081 (Fontana et al); 4,983,706 (Fontana et al); and 4,286,083 (Kochanowski).

Certain types of monomers for supplying the aliphatic ester units for the polyestercarbonate are usually preferred. For example, U.S. Pat. No. 4,983,706 describes the use of aliphatic alpha omega dicarboxylic acids containing from 8 to about 20 carbon atoms, and preferably, about 9 or 10 carbon atoms. Moreover, saturated acids are said to be preferred. In U.S. Pat. No. 5,274,068, the use of aliphatic diacids having from 4 to 8 carbon atoms (and preferably 6 atoms) is disclosed, with adipic acid being the preferred monomer. Furthermore, U.S. Pat. No. 4,286,083 describes the use of saturated, aliphatic dibasic acids derived from straight chain paraffin hydrocarbons, such as oxalic, malonic, dimethyl malonic, succinic, glutaric, adipic, pimelic, and the like. Two specific unsaturated acids are also mentioned for possible use: maleic acid and fumaric acid, each of which contains only 4 carbon atoms.

Clearly, there has been some success in reducing the melt viscosity of polycarbonate-based materials like the polyestercarbonates. However, further reductions in viscosity would be welcome. Even a small reduction in the Tg of the polymer would result in a very desirable increase in melt flow. Thus, a need still exists for polycarbonate-based materials with Tg's which are lower than those of the presently-available products. Moreover, the materials should still retain the other characteristics which make them attractive for a number of end uses—characteristics such as toughness, clarity, rigidity, and high impact resistance.

SUMMARY OF THE INVENTION

The present invention satisfies the needs discussed above. One embodiment is directed to a polyestercarbonate polymer which comprises repeating units of a mono-unsaturated aliphatic dicarboxylic acid having about 12 to about 20 carbon atoms. The dicarboxylic acid preferably has about 16 to about 18 carbon atoms. Preferred dicarboxylic acids for incorporation into the polymer are cis-octadec-9-enedioic acid or trans-octadec-9-enedioic acid. The use of these mono-unsaturated acids results in polymers with lower glass transition temperatures, enhancing their processibility.

Another embodiment of the invention is directed to a polyestercarbonate polymer, prepared by an interfacial process which comprises the reaction of a dihydric phenol with a carbonate precursor and at least one of the mono-unsaturated aliphatic dicarboxylic acids described above.

Numerous other details regarding these embodiments are provided below.

DETAILED DESCRIPTION OF THE INVENTION

The polyestercarbonates of the present invention are prepared by the reaction of a dihydric phenol, a carbonate precursor, and a mono-unsaturated aliphatic dicarboxylic acid, as described below. The reaction is often (but not always) carried out by an interfacial technique, which is generally described in Organic Polymer Chemistry, by K. J. Saunders, 1973, Chapman and Hall Ltd., as well as in the following U.S. Patents, all of which are incorporated herein by reference: U.S. Pat. Nos. 3,442,854; 5,026,817; 5,097,002; 5,142,018; 5,151,491; and 5,340,905.

The dihydric phenol can be any of those known in the art to be useful for making many types of polycarbonates. Exemplary dihydric phenols are based on the formula:

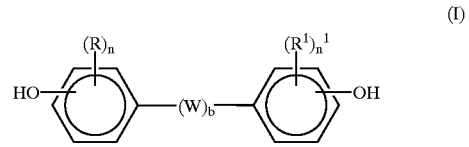

(I)

wherein

R is independently selected from the group consisting of halogens, monovalent hydrocarbons, and alkoxy radicals;

$R^1$ is independently selected from the group consisting of halogens, monovalent hydrocarbons, and alkoxy radicals;

W is selected from the group consisting of divalent hydrocarbon radicals; —S—, —S—S—, —O—,

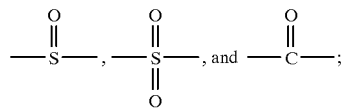

n and $n^1$ are independently selected from integers having a value of from 0 to 4 inclusive; and b is either 0 or 1.

The hydrocarbon radicals for R and $R^1$ include alkyl, cycloalkyl, aryl, aralkyl, and alkaryl radicals. Moreover, the divalent hydrocarbon radicals represented by W include the alkylene, alkylidene, cycloalkylene, and cycloalkylidene radicals.

Some non-limiting examples of dihydric phenols for the present invention are as follows:

bis(4-hydroxyphenyl)methane;
1,1-bis(4-hydroxyphenyl)ethane;
2,2-bis(4-hydroxyphenyl)propane (bisphenol A);
2,2-bis(4-hydroxyphenyl)butane;
2,2-bis(4-hydroxyphenyl)octane;
bis(4-hydroxyphenyl)methane;
2,2-bis(4-hydroxy-1-methylphenyl)propane;
1,1-bis(4-hydroxy-t-butylphenyl) propane;
2,2-bis(4-hydroxy-3-bromophenyl)propane;
1,1-bis(4-hydroxyphenyl)cyclopentane;
1,1-bis(4-hydroxyphenyl)cyclohexane;
4,4'-dihydroxydiphenyl ether
4,4'-dihydroxy-3,3'-dimethylphenyl ether;
4,4'-dihydroxydiphenyl sulfide
4,4'-dihydroxy-3,3'-dimethyidiphenyl sulfide;
4,4'-dihydroxydiphenyl sulfoxide
4,4'-dihydroxy-3,3'-dimethyldiphenyl sulfoxide
4,4'-dihydroxydiphenyl sulfone; and
4,4'-dihydroxy-3,3'-dimethyldiphenyl sulfone.

Useful dihydric phenols are also described in U.S. Pat. Nos. 2,999,835; 3,028,365; 3,334,154; and 4,131,575, all of which are incorporated herein by reference. Moreover, various dihydroxy spirobiindanes could be used as the dihydric phenol, such as 6,6'-dihydroxy-3,3,3',3'-tetramethyl-1,1'-spirobiindane. In most preferred embodiments, the dihydric phenol is bisphenol A.

Any of the standard carbonate precursors used in interfacial reactions can be employed here. Phosgene is often the material of choice.

Suitable catalyst systems for synthesizing polyestercarbonates are also known in the art. Many of them include the tertiary amines, e.g., aliphatic amines and heterocyclic amines. In preferred embodiments, the amine is a trialkylamine containing no branching on the carbon atoms in the 1- and 2-positions. In some instances, triethylamine is most preferred.

In alternative embodiments, a phase transfer catalyst system may also be used. Examples include ammonium salts, phosphonium salts, hexa-alkyl guanidinium halides, and crown ethers. A preferred catalyst of this type is $C_6H_5CH_2N+Me_3Cl-$.

A chain-terminating agent ("chain-stopper") is usually employed to control the molecular weight of the polymer product being formed. The agents used in polycarbonate synthesis are usually used here. Examples include monohydroxyaromatic compounds such as phenol, p-t-butylphenol, and p-cumylphenol. Phenol is often preferred. The chain-stoppers are usually present at a level in the range of about 2 to about 5 mole percent, based on the amount of dihydric phenol being employed.

As mentioned above, a mono-unsaturated aliphatic dicarboxylic acid is used to prepare the polyestercarbonates of the present invention. The acid contains about 12 to about 20 carbon atoms and preferably, about 16 to about 18 carbon atoms. While either cis- or trans- dicarboxylic acids could be employed, those having a cis configuration are usually preferred.

Specific examples of suitable mono-unsaturated aliphatic dicarboxylic acids for this invention are as follows: cis-octadec-9-enedioic acid; trans-octadec-9-enedioic acid; cis-hexadec-8-enedioic acid; trans-hexadec-8-enedioic acid; cis-tetradec-7-enedioic acid; trans-tetradec-7-enedioic acid; cis-tetradec-5-enedioic acid; trans-tetradec-5-enedioic acid; cis-hexadec-7-enedioic acid; trans-hexadec-7-enedioic acid; and cis-eicos-10-enedioic acid. In preferred embodiments, cis-octadec-9-enedioic acid and trans-octadec-9-enedioic acid are preferred, with the cis-isomer being especially preferred.

It should be understood that mixtures of mono-unsaturated aliphatic dicarboxylic acids may also be used to prepare the polyestercarbonates of the present invention. For example, mixtures of the cis- and trans-isomers of the same diacid could be employed. Moreover, mixtures of different mono-unsaturated aliphatic dicarboxylic acids (which contain 12 to 20 carbon atoms) could be used. Such mixtures often result when the diacids are obtained by way of biosynthetic processes, as further described below.

Sometimes, mixtures of mono-unsaturated aliphatic dicarboxylic acids and saturated aliphatic dicarboxylic acids can also be employed, e.g., a mixture of cis-octadec-9-enedioic acid ("C-18.1") and octadecanedicarboxylic acid ("C-18.0"). The amount of saturated dicarboxylic acid will usually be no greater than about 5% by weight of the mixture, to ensure desirable glass transition temperatures for the resulting polyestercarbonates. In preferred embodiments, the amount of saturated dicarboxylic acid will be no greater than about 2% by weight of the mixture.

Some of the dicarboxylic acids for this invention can be made by conventional organic synthesis techniques, adapting the methods used to prepare monocarboxylic acids. Very often, however, aliphatic dicarboxylic acids are derived from aliphatic mono-carboxylic acids obtained from animal and vegetable fats. As described in *Organic Chemistry*, by Morrison and Boyd, 3rd Edition (Allyn and Bacon, Inc., incorporated herein by reference), the fatty mono-carboxylic acids upon which these fats (i.e., glycerides) are based are all straight-chain compounds, ranging from 8 to 18 carbon atoms. In general, only acids containing an even number of carbons are present in substantial amounts. Fat molecules are built up, two carbons at a time, from acetate units, according to a set of steps which is very similar to the malonic ester synthesis typically undertaken by an organic chemist. The *Organic Chemistry* text provides additional, instructive information regarding the biosynthesis of fatty monocarboxylic acids. Those individuals who are familiar with biosynthesis and have ordinary skill in the art of organic synthesis will be able to readily prepare the required mono-unsaturated dicarboxylic acids from the fatty mono-unsaturated monocarboxylic acids.

The mono-unsaturated aliphatic dicarboxylic acid is present at a level which depends on its molecular weight and the desired Tg (melt flow) of the polyestercarbonate. Usually, the acid (or mixtures of acids) is present at a level of about 4 mole % to about 20 mole %, based on the total moles of calculated polyestercarbonate polymer. In preferred embodiments, the level is about 4 mole % to about 9 mole %. In some especially preferred embodiments, the level is about 6 mole % to about 7 mole %. The specific level of dicarboxylic acid will depend on various factors, such as the type of dihydric phenol employed; the specific dicarboxylic acid utilized; the desired molecular weight of the final polymer, and the desired Tg of the final polymer.

According to known procedures for preparing polyestercarbonates, the pH of the reaction system is adjusted in steps. Generally, a pH range of about 8 to 9 is maintained during about the first 70–95% of the phosgenation. After that period, the pH is raised to a level of about 10 to about 12, and, preferably, about 10.2 to about 11.2, while the remainder of the phosgenation is carried out. An excess of phosgene is usually employed to ensure as complete a reaction as possible. Sometimes, a pre-equilibration of the reactants (other than phosgene) is carried out at the initial reaction pH, for a period of time, e.g., 3 to 10 minutes. This step seems to improve the incorporation of the dicarboxylic acid into the polymer. Usually, the solid dicarboxylic acids are ground to a fine powder, to ensure minimal particle size and maximum surface area. In this form, the particles are more easily dissolved in the reaction system at the pH range of 8 to 9.

Other details regarding the preparation of polyestercarbonates can be found in various sources, such as the following patents (some of which were discussed earlier), all incorporated herein by reference: U.S. Pat. Nos. 5,274,068; 5,025,081; 4,983,706; and 4,286,083. The aliphatic dicarboxylic acid can be charged to the reactor, or can be added in the form of a salt, with the particular dihydric phenol being employed, e.g., bisphenol A. Moreover, the chain-stopper can be added to the reaction vessel initially, or can be added at a later stage. The reactor is initially filled with the organic solvent, e.g., methylene chloride. The phosgene is added after the other components are present in the reaction vessel. The pH-controlling component (e.g., sodium hydroxide) is also added during the phosgene-addition. Other useful details can be found in the examples which follow.

The polyestercarbonate polymer usually has a molecular weight (weight average) in the range of about 50,000 to about 70,000, and preferably, in the range of about 55,000 to about 65,000. Its glass transition temperature is usually about 85° C. to about 135° C., and preferably, about 124° C. to about 130° C.

EXAMPLES

All of these examples are merely illustrative, and should not be construed to be any sort of limitation on the scope of the claimed invention.

In each of the examples, GPC (gel permeation chromatography) analysis was carried out according to standard procedures for polycarbonates. The reported molecular weights are relative to polystyrene standards.

Glass transition temperature measurements were made with a Perkin Elmer DSC 7 Differential Scanning Calorimeter. The measurements were performed in a nitrogen-purged oven, using approximately 10 mg of material. The heating rate was 20° C. per minute. The data were analyzed with a Perkin Elmer 7 Series Thermal Analysis System.

The rheology measurements were made with a Rheometrics Dynamic Spectrometer Model 7700. The measurements were performed in a nitrogen-purged oven, using a 25 mm parallel plate test geometry. The viscosity-versus-time measurements (which were carried out after two viscosity-versus-shear rate sweeps on the sample) were made at a frequency of 1 rad/sec, and a temperature of 270° C.

Temperature values in these examples are expressed in degrees Centigrade, unless otherwise specified.

EXAMPLE 1

This example provides the necessary details regarding the preparation of polyestercarbonates from bisphenol A and various dicarboxylic acids (samples 1, 2 and 3 below). A 500 mL 5-necked round-bottomed flask, was charged with 19.50 g (0.0854 mole) bisphenol-A; 0.4900 g (0.00231 mole) para-cumylphenol; and the specified amount of the particular dicarboxylic acid:

Sample 1: 1.90 g (0.00604 mole) octadecanedioic acid;

Sample 2: 1.90 g (0.00608 mole) cis-octadec-9-enedioic acid; and

Sample 3: 1.90 g (0.00825 mole) dodecanedioic acid.

The following constituents were also charged to the flask: 150 mL methylene chloride, 50 mL water, and 197 µL triethylamine. The flask was fitted with a gas inlet tube, a mechanical stirrer, a caustic addition tube; a condenser utilizing aqueous ethylene glycol at 40° F. (4.4° C.) as the heat exchange fluid; and a pH electrode connected to a pH controller interfaced with a pump for delivering the caustic solution (aqueous 33% sodium hydroxide). The top of the condenser was connected via Tygon tubing to two caustic traps in series (the first one containing 100 mL 45% aqueous potassium hydroxide, 200 mL water, and 300 mL methanol; the second one containing 200 mL of 45% potassium hydroxide and 400 mL methanol). The container of aqueous sodium hydroxide solution was placed on a balance and tared. The pH controller was initially set to a pH of 8.0.

Prior to starting the phosgenation, a slow purge of nitrogen was effected through the reaction system (indicated to be leak-free by the appearance of bubbles in the two potassium hydroxide traps). The nitrogen purge was then turned off, and the phosgene tank was enabled. An equivalent of caustic was added to the reaction flask, and the mixture was stirred for 5 minutes. Then, the phosgene delivery system, previously programmed to deliver 1.20 equivalents of phosgene at the rate of 0.500 g/min, was turned on. After 9.0 minutes (i.e. 40% of the total phosgene to be delivered), the pH controller was adjusted from 8.0 to 10.5 at the rate of 0.3 pH units per 30 seconds. When the specified amount of phosgene had been delivered, the phosgene delivery was automatically terminated. The nitrogen purge was turned back on, and the reaction mixture was stirred for an additional 5 minutes. During this nitrogen-purge period, the reaction mixture was periodically checked for the presence of chloroformates—none were detectable after about 2 minutes.

When the nitrogen-purge period was completed, the reaction mixture was poured into a separatory funnel. The reaction flask was rinsed 3 times with a total of 100 mL methylene chloride. The rinsings were added to the separatory funnel, and the layers were then separated. The lower organic phase was drained off and washed twice with 100 mL portions of 1N aqueous hydrochloric acid, and four times with 100 mL portions of distilled water. Centrifugation was utilized to effect efficient separation of the aqueous wash layers and the methylene chloride solution of the polyestercarbonate. The resulting methylene chloride solution (about 250 mL) was then dripped into 2 L of methanol contained in a Waring blender, while being chopped.

The precipitated polymer was then isolated by filtration and returned to the Waring blender with 1 L of fresh methanol, and then re-chopped. The polymer was then isolated by filtration and dried in a vacuum oven. Table 1 (below) presents relevant information about the polyestercarbonates prepared in these experiments.

A portion of the upper aqueous phase (approximately 5 mL, often referred to as the "brine" layer) was acidified with hydrochloric acid, and then examined visually for the precipitation of any unreacted dicarboxylic acid. No precipitates were detected for any of the samples.

TABLE 1

Comparison of Tg of Polyestercarbonates Made From
Octadecanedioic Acid, Cis-octadec-9-enedioic Acid, and
Dodecanedioic Acid.

| Sample # | Diacid* | Wt. % | Mole % | $M_w$ | Tg*** |
|---|---|---|---|---|---|
| 1** | C-18.0 | 8.68 | 6.44 | 52,900 | 128.3 |
| 2 | C-18.1 | 8.68 | 6.48 | 60,300 | 126.4 |
| 3** | C-12.0 | 8.68 | 8.60 | 63,200 | 130.2 |

*C-18.0 = octadecanedicarboxylic acid; C-18.1 = cis-octadec-9-enedioic acid; C-12.0 = dodecanedioic acid.
**Comparative samples
***Degrees Centigrade As shown in the table, the glass transition temperature of the polyestercarbonate based on C-1 8.1 is lower (by 1.9° C.) than the Tg of the polyestercarbonate derived from C-18.0, and lower (by 3.8° C.) than the Tg of the polyestercarbonate derived from C-12.0.

Additional experiments were then undertaken to prepare polyestercarbonates.

EXAMPLE 2

This example provides details regarding the preparation of samples 4 and 6, which are discussed below. A 500 mL 5-necked round-bottomed flask was charged with 19.50 g (0.0854 mole) bisphenol-A; 0.4900 g (0.00231 mole) para-cumylphenol, and the specified amount of the particular dicarboxylic acid:

Sample 4: 1.90 g (0.00604 mole) octadecanedioic acid; and

Sample 6: 1.90 g (0.00608 mole) cis-octadec-9-enedioic acid.

The following constituents were also charged to the flask: 120 mL methylene chloride, 72 mL water, and 197 µL triethylamine. The flask was fitted with a gas inlet tube, a mechanical stirrer, a caustic-addition tube, a condenser utilizing aqueous ethylene glycol at 40° F. (4.4° C.) as the heat exchange fluid; and a pH electrode connected to a pH controller interfaced with a pump for delivering the caustic solution (aqueous 33% sodium hydroxide). The top of the condenser was connected via Tygon tubing to two caustic traps in series (the first one containing 100 mL 45% aqueous potassium hydroxide, 200 mL water, and 300 mL methanol; the second one containing 200 mL of 45% potassium hydroxide and 400 mL methanol). The container of aqueous sodium hydroxide solution was placed on a balance and tared. The pH controller was initially set to a pH of 8.0.

Prior to starting the phosgenation, a slow purge of nitrogen was effected through the reaction system (indicated to be leak-free by the appearance of bubbles in the two potassium hydroxide traps). The nitrogen purge was then turned off, and the phosgene tank enabled. An equivalent of caustic was added to the reaction, and then, the phosgene delivery system, previously programmed to deliver 1.20 equivalents of phosgene at the rate of 0.317 g/min, was turned on. After 4.684 g of phosgene (40% of the total phosgene to be delivered and 48% of the equivalent phosgene) had been delivered, the phosgene delivery rate was increased to 0.476 g/min. After an additional 6.2065 g of phosgene (bringing the amount of phosgene delivered to 93% of the pre-selected total) had been delivered, the phosgene delivery rate was decreased to 0.159 g/min. After 5.86 g of phosgene had been delivered, the pH controller was adjusted from 8.0 to 10.5 at the rate of 0.3 pH units per 30 seconds. When the total specified amount of phosgene had been delivered, the phosgene delivery was automatically stopped.

The nitrogen purge was turned back on, and the reaction mixture was stirred for an additional 5 minutes. During this nitrogen-purge period, the reaction mixture was periodically checked for the presence of chloroformates—none were detectable after about 2 minutes. When the nitrogen-purge period was completed, the reaction mixture was processed as in Example 1. Table 2 presents the relevant information about the polyestercarbonates prepared in these experiments.

A brine layer having a volume of about 5 mL was acidified with hydrochloric acid and then examined visually for the precipitation of any unreacted dicarboxylic acid. No precipitates were detected in either sample.

Example 3

This example provides details regarding the preparation of samples 5 and 7, which are discussed below. A 500 mL 5-necked round-bottomed flask was charged with 19.50 g (0.0854 mole) bisphenol-A; 0.4900 g (0.00231 mole) para-cumylphenol, and the specified amount of the particular dicarboxylic acid:

Sample 5: 1.90 g (0.00604 mole) octadecanedioic acid;

Sample 7: 1.90 g (0.00608 mole) cis-octadec-9-enedioic acid.

The following constituents were also charged to the flask: 120 mL methylene chloride, 72 mL water, and 197 µL triethylamine. The flask was fitted with a gas inlet tube, a mechanical stirrer, a caustic addition tube, a condenser utilizing aqueous ethylene glycol at 40° F. (4.4° C.) as the heat exchange fluid, and a pH electrode connected to a pH controller interfaced with a pump for delivering the caustic solution (aqueous 33% sodium hydroxide). The top of the condenser was connected via Tygon tubing to two caustic traps in series (the first one containing 100 mL 45% aqueous potassium hydroxide, 200 mL water, and 300 mL methanol; the second one containing 200 mL of 45% potassium hydroxide and 400 mL methanol). The container of aqueous sodium hydroxide solution was placed on a balance and tared. The pH controller was initially set to a pH of 8.0.

Prior to starting the phosgenation, a slow purge of nitrogen was effected through the reaction system (indicated to be leak-free by the appearance of bubbles in the two potassium hydroxide traps). The nitrogen purge was then turned off, and the phosgene tank enabled. An equivalent of caustic was added to the reaction. The phosgene delivery system, previously programmed to deliver 1.20 equivalents of phosgene at the rate of 0.500 g/min, was then turned on. After 7.813 g of phosgene (66.7% of the total phosgene to be delivered and 80% of the equivalent phosgene) had been delivered, the phosgene delivery was stopped, and kept off for a period of 10 minutes. After 7.813 g of phosgene had been delivered, the pH controller was adjusted from 8.0 to 10.5 at the rate of 0.3 pH units per 30 seconds. After the 10 minute "phosgene-off" period was completed, the phosgene delivery was resumed at the rate of 0.5301 g/min until an additional 3.907 g of phosgene had been delivered (bringing the total phosgene delivered to 11.720 g, 1.20 equivalents), at which time the phosgene delivery was stopped.

The nitrogen purge was then turned back on, and the reaction mixture was stirred for an additional 5 minutes. During this nitrogen-purge period, the reaction mixture was periodically checked for the presence of chloroformates. No chloroformates were detectable after about 2 minutes. When the nitrogen-purge period was completed, the reaction mixture was treated as described in Example 1, to provide the dried polyestercarbonate. Table 2, set forth below, presents relevant information about the polyestercarbonates prepared in these experiments.

A portion of the "brine" layer (about 5 mL) was acidified with hydrochloric acid, and then examined visually for the precipitation of any unreacted dicarboxylic acid. No precipitates were detected for either sample.

EXAMPLE 4

This example provides details regarding the preparation of sample 8, which is also referred to in Table 2 below. Sample 8 was prepared according to the procedure described for Example 3, except that 39.00 g (0.1708 mole) bisphenol-A; 3.8244 (0.01661 mole) of dodecanedioic acid; 0.98 g (0.00462 mole) of para-cumylphenol; and 394 μL of triethylamine were charged into the reaction flask.

After 7.813 g of phosgene (66.7% of the total phosgene to be delivered and 80% of the equivalent phosgene) had been delivered, the phosgene delivery was stopped and kept off for a period of 10 minutes. After 16.33 g of phosgene had been delivered at the rate of 1.0 g/min, the pH controller was adjusted from 8.0 to 10.5 at the rate of 0.3 pH units per 30 seconds. After the 10 minute "phosgene off" period was completed, the phosgene delivery was resumed at the rate of 1.228 g/min until an additional 8.165 g of phosgene had been delivered (bringing the total phosgene delivered to 24.495 g, 1.20 equivalents), at which time the phosgene delivery was stopped.

The nitrogen purge was turned back on, and the reaction mixture was stirred for an additional 5 minutes. During this nitrogen-purge period, the reaction mixture was periodically checked for the presence of chloroformates—none were detectable after about 2 minutes. When the nitrogen-purge period was completed, the reaction mixture was treated as in Example 1, to provide the dried polyestercarbonate. Table 2 presents relevant information about the polyestercarbonate prepared in this experiment.

As in the previous experiments, a portion of the "brine" layer (about 5 mL) was acidified with hydrochloric acid, and then examined visually for the precipitation of any unreacted dicarboxylic acid. No precipitates were detected for the sample.

EXAMPLE 5

This example provides details regarding the preparation of sample 9, which is also referred to in Table 2 below. Sample 9 was prepared according to the procedure described for Example 2, except that 39.00 g (0.1708 mole) bisphenol-A; 0.98 g (0.00462 mole) of para-cumylphenol; and 394 μL of triethylamine were charged into the reaction flask, along with dodecanedioic acid (3.8244 g (0.01661 mole)). After 7.813 g of phosgene (66.7% of the total phosgene to be delivered and 80% of the equivalent phosgene) had been delivered, the phosgene delivery was stopped and kept off for a period of 10 minutes. After 9.8 g of phosgene (40% of the total phosgene to be delivered and 48% of the equivalent phosgene) had been delivered at the rate of 0.634 g/min, the phosgene delivery rate was increased to 0.952 g/min. After an additional 12.9 g of phosgene (bringing the amount of phosgene delivered to 93% of the pre-selected total) had been delivered, the phosgene delivery rate was decreased to 0.318 g/min. After an additional 12.3 g of phosgene had been delivered, the pH controller was adjusted from 8.0 to 10.5 at the rate of 0.3 pH units per 30 seconds. When the total specified amount of phosgene had been delivered, the phosgene delivery was automatically terminated.

The nitrogen purge was then turned back on, and the reaction mixture was stirred for an additional 5 minutes. During this nitrogen-purge period, the reaction mixture was periodically checked for the presence of chloroformates. None were detectable after about 2 minutes. When the nitrogen-purge period was completed, the reaction mixture was treated as described in Example 1. Table 2 presents the relevant information about this polyestercarbonate, as well as those prepared in Examples 2–4.

As in the previous examples, a portion of the "brine" layer (about 5 mL) was acidified with hydrochloric acid, and then examined visually for the precipitation of any unreacted dicarboxylic acid. No precipitates were detected.

TABLE 2

Additional Comparison Of $T_g$ Of Polyestercarbonates Made From Octadecanedioic Acid, Cis-octadec-9-enedioic Acid, and Dodecanedioic Acid.

| Sample # | Diacid* | Wt. % | Mole % | $M_w$ | $T_g$ |
|---|---|---|---|---|---|
| 4** | C-18.0 | 8.68 | 6.44 | 64,700 | 128.4 |
| 5** | C-18.0 | 8.68 | 6.44 | 64,000 | 128.4 |
| 6 | C-18.1 | 8.68 | 6.48 | 71,100 | 126.1 |
| 7 | C-18.1 | 8.68 | 6.48 | 72,200 | 126.3 |
| 8** | C-12.0 | 8.68 | 8.60 | 70,600 | 130.2 |
| 9** | C-12.0 | 8.68 | 8.60 | 69,000 | 131.0 |

*C-18.0 = octadecanedicarboxylic acid; C-18.1 = cis-octadec-9-enedioic acid; C-12.0 = dodecanedioic acid.
**Comparative samples The data of Table 2 confirm the decreased glass transition temperatures for polyestercarbonates based on C-18.1.

EXAMPLE 6

This example provides details regarding the preparation of samples 10, 11 and 12, which are discussed below. A 500 mL 5-necked round-bottomed flask was charged with 19.50 g (0.0854 mole) bisphenol-A; 0.4900 g (0.00231 mole) para-cumylphenol, and the specified amount of the particular dicarboxylic acid:

Sample 10: 1.90 g (0.00826 mole) dodecanedioic acid;
Sample 11: 1.90 g (0.00609 mole) cis-octadec-9-enedioic acid; and
Sample 12: 1.90 g (0.00605 mole) octadecanedioic acid.

The following constituents were also charged to the flask: 88 mL methylene chloride, 53 mL water, and 197 μL triethylamine. The flask was fitted with a gas inlet tube, a mechanical stirrer, a caustic-addition tube, a condenser utilizing aqueous ethylene glycol at 40° F. (4.4° C.) as the heat exchange fluid, and a pH electrode connected to a pH controller interfaced with a pump, for delivering the caustic solution (aqueous 33% sodium hydroxide). The top of the condenser was connected via Tygon tubing to two caustic traps in series (the first one containing 100 mL of 45% aqueous potassium hydroxide, 200 mL water, and 300 mL methanol; the second one containing 200 mL of 45% potassium hydroxide and 400 mL methanol). The container of aqueous sodium hydroxide solution was placed on a balance and tared. The pH controller was initially set to pH of 8.0.

Prior to starting the phosgenation, a slow purge of nitrogen was effected through the reaction system (indicated to be leak-free by the appearance of bubbles in the two potassium hydroxide traps). The nitrogen purge was then turned off, and the phosgene tank enabled. An equivalent of caustic was added to the reaction, and then the phosgene delivery system, previously programmed to deliver 1.20 equivalents of phosgene at the rate of 0.317 g/min, was turned on. After 10.4 g of phosgene (93% of the pre-selected total) had been delivered, the phosgene delivery rate was decreased to 0.1585 g/min. After 5.86 g of phosgene had been delivered, the pH controller was adjusted from 8.0 to 10.5 at the rate of 0.3 pH units per 30 seconds. After an additional 0.86 g of phosgene (bringing the amount of phosgene delivered to 100% of the pre-selected total) had been delivered, the phosgene delivery system was stopped.

The nitrogen purge was then turned back on, and the reaction mixture stirred for an additional 5 minutes. During this nitrogen-purge period, the reaction mixture was periodically checked for the presence of chloroformates—none were detectable after about 2 minutes. When the nitrogen-purge period was completed, the reaction mixture was processed as described for Example 1. Tables 3 and 4 present the relevant information about the polyestercarbonates prepared in these experiments.

The "brine" layer (a portion of about 5 mL) was acidified with hydrochloric acid, and then examined visually for the precipitation of any unreacted dicarboxylic acid. No precipitates were detected for any of the samples.

EXAMPLE 7

This example provides details regarding the preparation of samples 13, 14 and 15, which are discussed below. A 500 mL 5-necked round-bottomed flask was charged with 19.50 g (0.0854 mole) bisphenol-A, 0.4900 g (0.00231 mole) para-cumylphenol, and the specified amount of the particular dicarboxylic acid:

Sample 13: 1.90 g (0.00826 mole) dodecanedioic acid;

Sample 14: 1.90 g (0.00609 mole) cis-octadec-9-enedioic acid; and

Sample 15: 1.90 g (0.00605 mole) octadecanedioic acid.

The following constituents were also charged to the flask: 88 mL methylene chloride, 53 mL water, and 197 μL triethylamine. The flask was fitted with a gas inlet tube, a mechanical stirrer, a caustic-addition tube, a condenser utilizing aqueous ethylene glycol at 40° F. (4.4° C.) as the heat exchange fluid, and a pH electrode connected to a pH controller interfaced with a pump, for delivering the caustic solution (aqueous 33% sodium hydroxide). The top of the condenser was connected via Tygon tubing to two caustic traps in series (the first one containing 100 mL of 45% aqueous potassium hydroxide, 200 mL water, and 300 mL methanol; the second one containing 200 mL of 45% potassium hydroxide and 400 mL methanol). The container of aqueous sodium hydroxide solution was placed on a balance and tared. The pH controller was initially set to a pH of 8.0.

Prior to starting the phosgenation, a slow purge of nitrogen was effected through the reaction system (indicated to be leak-free by the appearance of bubbles in the two potassium hydroxide traps). The nitrogen purge was then turned off and the phosgene tank enabled. An equivalent of caustic was added to the reaction, and then the phosgene delivery system, previously programmed to deliver 1.20 equivalents of phosgene at the rate of 0.317 g/min, was turned on. After 7.5 g of phosgene (66.7% of the pre-selected total and 80% of the equivalent phosgene) had been delivered, the phosgene delivery was stopped and kept off for a period of 10 minutes. The pH controller was adjusted from 8.0 to 10.5 at the rate of 0.3 pH units per 30 seconds. After the 10 minute "phosgene-off" period was completed, the phosgene delivery was resumed at the rate of 0.317 g/min, until an additional 3.0 g of phosgene had been delivered. The phosgene delivery rate was then decreased to 0.1585 g/min. After 0.79 g of phosgene had been delivered, the phosgene delivery was stopped.

The nitrogen purge was then turned back on, and the reaction mixture stirred for an additional 5 minutes. During this nitrogen-purge period, the reaction mixture was periodically checked for the presence of chloroformates—none were detectable after about 2 minutes.

When the nitrogen-purge period was completed, the reaction mixture was processed as described in Example 1, to provide the dried polyestercarbonate. Tables 3 and 4 present relevant information about the polyestercarbonates prepared in these experiments.

The "brine" layer (a portion of about 5 mL) was acidified with hydrochloric acid and then examined visually for the precipitation of any unreacted dicarboxylic acid. No precipitates were detected for any of the samples.

TABLE 3

Further Comparison of Tg of Polyestercarbonates Made From Octadecanedioic Acid, Cis-octadec-9-enedioic Acid, and Dodecanedioic Acid.

| Sample # | Diacid* | Wt. % | Mole % | $M_w$ | Tg |
| --- | --- | --- | --- | --- | --- |
| 10** | C-12.0 | 8.69 | 8.61 | 75,100 | 131.3 |
| 11 | C-18.1 | 8.69 | 6.49 | 68,800 | 126.6 |
| 12** | C-18.0 | 8.69 | 6.45 | 73,600 | 127.3 |
| 13** | C-12.0 | 8.69 | 8.61 | 76,800 | 131.1 |
| 14 | C-18.1 | 8.69 | 6.49 | 70,100 | 126.8 |
| 15** | C-18.0 | 8.69 | 6.45 | 75,400 | 128.8 |

*C-18.0 = octadecanediacarboxylic acid; C-18.1 = cis-octadec-9-enedioic acid; C-12.0 = dodecanedioic acid.
**Comparative samples The data of Table 3 again confirm the decreased glass transition temperatures for polyestercarbonates based on C-18.1.

In regard to the data of Table 4, melt viscosity measurements were made at 270° C., with an oscillatory shear rate of 1.0 rad/sec. The final viscosity is taken after 30 minutes under those conditions.

TABLE 4

Further Comparison of Tg of Polyestercarbonates Made From Octadecanedioic Acid, Cis-octadec-9-enedioic Acid, and Dodecanedioic Acid

| Sample # | Diacid* | Visc.(I)$^a$ (poise) | Visc.(F)$^b$ (poise) | Δ Visc. (%) | Tg (°C.) |
| --- | --- | --- | --- | --- | --- |
| 10** | C-12.0 | 28,000 | 28,800 | 2.9 | 131.3 |
| 11 | C-18.1 | 17,700 | 17,600 | 0.6 | 126.6 |
| 12** | C-18.0 | 25,000 | 26,200 | 4.8 | 127.3 |
| 13** | C-12.0 | 28,500 | 28,400 | 0.4 | 131.1 |
| 14 | C-18.1 | 21,300 | 21,800 | 2.3 | 126.8 |
| 15** | C-18.0 | 27,700 | 27,900 | 0.7 | 128.8 |

*C-18.0 = octadecanedicarboxylic acid; C-18.1 = cis-octadec-9-enedioic acid; C-12.0 = dodecanedioic acid.
**Comparative samples
(a) Initial viscosity; (b) Final viscosity The data of Table 4 demonstrate that polyestercarbonates derived from the diacid (C-18.1) used in the present invention have a lower melt viscosity than polyestercarbonates derived from other diacids. Moreover, the polyestercarbonates derived from the C-18.1 diacid possessed excellent melt viscosity stability. The changes in melt viscosity after 30 minutes of oscillatory shear were very slight.

EXAMPLE 8

This example provides details regarding the preparation of samples 16, 17, 18, and 19, which are discussed below. A 25 L glass reactor was charged with the following ingredients: 1950 g (8.54 mole) bisphenol-A, 49.00 g (0.2308 mole) para-cumylphenol; and the specified amount of the particular dicarboxylic acid:

Sample 16: 190.24 g (0.8260 mole) dodecanedioic acid;
Sample 17: 190.24 g (0.6089 mole) cis-octadec-9-enedioic acid;
Sample 18: 190.24 g (0.6089 mole) cis-octadec-9-enedioic acid; and
Sample 19: 190.24 g (0.6050 mole) octadecanedioic acid The following constituents were also charged to the flask: 19.7 mL (14.27 g, 0.1410 mole) triethylamine; 8 L methylene chloride; and 5.3 L water. The polymerization reaction was conducted according to the procedure utilized for Example 6 (scale-adjusted). The polyestercarbonates were isolated by precipitation in methanol, stirred rapidly by a Henschel mixer. Tables 5 and 6 present relevant information about the polyestercarbonates prepared in these experiments.

A portion of the upper aqueous phase (approximately 5 mL—the "brine" layer) was acidified with hydrochloric acid and then examined visually for the precipitation of any unreacted dicarboxylic acid. No precipitates were detected for any of the samples.

TABLE 5

Additional Comparison of Tg Of Polyestercarbonates Made From Octadecanedioic Acid, Cis-octadec-9-enedioic Acid, and Dodecanedioic Acid.

| Sample # | Diacid* | Wt. % | Mole % | $M_w$ | Tg |
| --- | --- | --- | --- | --- | --- |
| 16** | C-12.0 | 8.69 | 8.61 | 65,400 | 131.5 |
| 17 | C-18.1 | 8.69 | 6.49 | 62,400 | 126.3 |
| 18 | C-18.1 | 8.69 | 6.49 | 53,200 | 125.4 |
| 19** | C-18.0 | 8.69 | 6.45 | 61,800 | 129.0 |

*C-18.0 = octadecanedicarboxylic acid; C-18.1 = cis-octadec-9-enedioic acid; C-12.0 = dodecanedioic acid.
**Comparative samples The data of Table 5 again confirm the decreased glass transition temperatures for polyestercarbonates based on C-18.1.

Table 6 sets forth various properties for some of the samples described previously:

TABLE 6

Comparison of Performance Characteristics of Polyestercarbonates Made From Octadecanedioic Acid, Cis-octadec-9-enedioic Acid, and Dodecanedioic Acid

| Property | Sample 17 | Sample 19* | Sample 16* |
| --- | --- | --- | --- |
| Notched Izod[a] | 17.7 | 17.0 | 18.8 |
| Tensile Elongation[b] | 117 | 115 | 92 |
| Tensile Yield[c] | 8700 | 8800 | 8500 |
| Tensile Break[c] | 9400 | 9300 | 8500 |
| Flexural Modulus[d] | 334,000 | 330,000 | 327,000 |
| Flexural Strength[d] | 13,100 | 12,900 | 12,600 |

*Comparative Samples: Sample 16 is polyestercarbonate made from C-12.0 (dodecanedioic acid); Sample 19 is polyestercarbonate made from C-18.0 (octa-decanedicarboxylic acid).
Sample 17 is polyestercarbonate made from C-18.1 (cis-octadec-9-enedioic acid)
(a) ASTM D-256, in "ft-lb/in.", test specimen, 0.125 in., temperature of 73° F. (22.8° C.);
(b) ASTM D-638, in percent (%), test specimen, 0.125 in.
(c) ASTM D-638, in psi, test specimen, 0.125 in.
(d) ASTM D-790, in psi, test specimen, 0.125 in.

The data of Table 6 demonstrate that polyestercarbonates of the present invention exhibit performance characteristics which are comparable to those of prior art polyestercarbonates.

Although the preferred embodiments have been set forth herein for the purpose of illustration, this description should not be deemed to be a limitation on the scope of the invention. Accordingly, various modifications, adaptations, and alternatives may occur to one skilled in the art without departing from the spirit and scope of the claimed inventive concept.

All of the patents, articles, and texts mentioned above are incorporated herein by reference.

What is claimed:

1. A polyestercarbonate polymer which comprises repeating units of a mono-unsaturated aliphatic dicarboxylic acid having about 12 to about 20 carbon atoms.

2. The polyestercarbonate polymer of claim 1, wherein the dicarboxylic acid has a cis configuration.

3. The polyestercarbonate polymer of claim 1, wherein the dicarboxylic acid contains about 16 to about 18 carbon atoms.

4. The polyestercarbonate polymer of claim 3, wherein the dicarboxylic acid is selected from the group consisting of cis-octadec-9-enedioic acid and trans-octadec-9-enedioic acid.

5. The polyestercarbonate polymer of claim 3, wherein the dicarboxylic acid is cis-octadec-9-enedioic acid.

6. The polyestercarbonate polymer of claim 1, wherein the dicarboxylic acid is selected from the group consisting of cis-octadec-9-enedioic acid; trans-octadec-9-enedioic acid; cis-hexadec-8-enedioic acid; trans-hexadec-8-enedioic acid; cis-tetradec-7-enedioic acid; trans-tetradec-7-enedioic acid; cis-tetradec-5-enedioic acid; trans-tetradec-5-enedioic acid; cis-hexadec-7-enedioic acid; trans-hexadec-7-enedioic acid; and cis-eicos-10-enedioic acid.

7. The polyestercarbonate polymer of claim 1, comprising a mixture of mono-unsaturated aliphatic dicarboxylic acids, each containing about 12 to about 20 carbon atoms.

8. The polyestercarbonate polymer of claim 1, further comprising a saturated aliphatic dicarboxylic acid in an amount no greater than about 5% by weight, based on the total weight of mono-unsaturated aliphatic dicarboxylic acid and saturated aliphatic dicarboxylic acid.

9. The polyestercarbonate polymer of claim 4, further comprising at least one saturated aliphatic dicarboxylic acid in an amount no greater than about 5% by weight, based on the total weight of mono-unsaturated aliphatic dicarboxylic acid and saturated aliphatic dicarboxylic acid.

10. The polyestercarbonate polymer of claim 9, wherein the saturated aliphatic dicarboxylic acid is present in an amount no greater than about 2% by weight, based on the total weight of mono-unsaturated aliphatic dicarboxylic acid and saturated aliphatic dicarboxylic acid.

11. The polyestercarbonate polymer of claim 9, wherein the saturated aliphatic dicarboxylic acid is octadecanedicarboxylic acid.

12. The polyestercarbonate polymer of claim 1, further comprising the residue of bisphenol A as a dihydric phenol.

13. The polyestercarbonate polymer of claim 1, wherein the mono-unsaturated aliphatic dicarboxylic acid is present at a level of about 4 mole % to about 20 mole %, based on the total moles of polyestercarbonate polymer.

14. The polyestercarbonate polymer of claim 13, wherein the mono-unsaturated aliphatic dicarboxylic acid is present at a level of about 4 mole % to about 9 mole %.

15. The polyestercarbonate polymer of claim 1, having a molecular weight (weight average) in the range of about 50,000 to about 70,000.

16. The polyestercarbonate polymer of claim 1, having a glass transition temperature (Tg) of about 85° C. to 135° C.

17. A polyestercarbonate polymer, prepared by an interfacial progress which comprises the reaction of a dihydric phenol with a carbonate precursor and at least one mono-unsaturated aliphatic dicarboxylic acid having about 12 to about 20 carbon atoms.

18. The polyestercarbonate polymer of claim 17, wherein the dihydric phenol is bisphenol A.

19. The polyestercarbonate polymer of claim 17, wherein the carbonate precursor is phosgene.

20. The polyestercarbonate polymer of claim 17, wherein the mono-unsaturated aliphatic dicarboxylic acid has a cis configuration, and contains about 16 to about 18 carbon atoms.

21. The polyestercarbonate polymer of claim 20, wherein the mono-unsaturated aliphatic dicarboxylic acid is cis-octadec-9-enedioic acid.

22. The polyestercarbonate polymer of claim 17, wherein the dihydric phenol and carbonate precursor are reacted with a mixture of mono-unsaturated aliphatic dicarboxylic acids having about 12 to about 20 carbon atoms, and wherein the mixture further comprises at least one saturated aliphatic dicarboxylic acid in an amount no greater than about 5% by weight, based on the total weight of mono-unsaturated aliphatic dicarboxylic acids and saturated aliphatic dicarboxylic acids.

23. A method for preparing a polyestercarbonate polymer, comprising reacting, in the presence of at least one catalyst, a carbonyl halide, a dihydric phenol, and at least one mono-unsaturated aliphatic dicarboxylic acid having about 12 to about 20 carbon atoms, said reaction being carried out initially in a solvent medium which is maintained at a pH of about 8 to about 9 until the dicarboxylic acid is consumed, wherein the pH of the reaction medium is then increased to about 10 to about 12 until the completion of the reaction.

24. The method of claim 23, wherein the mono-unsaturated aliphatic dicarboxylic acid is selected from the group consisting of cis-octadec-9-enedioic acid and trans-octadec-9-enedioic acid.

25. The method of claim 23, wherein an additional component for the reaction is at least one saturated aliphatic dicarboxylic acid in an amount no greater than about 5% by weight, based on the total weight of mono-unsaturated aliphatic dicarboxylic acid and saturated aliphatic dicarboxylic acid.

26. The polyestercarbonate polymer of claim 1, wherein the dicarboxylic acid is an -enedioic acid.

* * * * *